United States Patent
Sakamoto (10) Patent No.: US 9,459,501 B2
(45) Date of Patent: Oct. 4, 2016

(54) DISPLAY DEVICE

(71) Applicant: Mitsubishi Electric Corporation, Tokyo (JP)

(72) Inventor: Takuya Sakamoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 10 days.

(21) Appl. No.: 14/526,630

(22) Filed: Oct. 29, 2014

(65) Prior Publication Data

US 2015/0131024 A1    May 14, 2015

(30) Foreign Application Priority Data

Nov. 12, 2013 (JP) ................................. 2013-233793

(51) Int. Cl.
   *G02F 1/133*   (2006.01)
   *G02F 1/1345*  (2006.01)
   *G02F 1/1333*  (2006.01)

(52) U.S. Cl.
   CPC .......... *G02F 1/13452* (2013.01); *G02F 1/1345* (2013.01); *G02F 2001/133317* (2013.01)

(58) Field of Classification Search
   CPC .......................... G02F 1/13452; G02F 1/1345
   See application file for complete search history.

(56) References Cited

U.S. PATENT DOCUMENTS

| 8,976,314 B2 * | 3/2015 | Chun ................... G02F 1/1333 349/149 |
| 2009/0225253 A1 * | 9/2009 | Oohira ................ G02B 6/0073 349/58 |
| 2013/0215359 A1 * | 8/2013 | Chun ................... G02F 1/1333 349/58 |

FOREIGN PATENT DOCUMENTS

JP    2006-235092 A    9/2006

* cited by examiner

*Primary Examiner* — Phu Vu
(74) *Attorney, Agent, or Firm* — Studebaker & Brackett PC (57) ABSTRACT

A display device according to the present invention includes a display panel (liquid crystal panel); a backlight located on a rear surface of the display panel; a circuit board located on a rear surface of the backlight; flexible wiring located between a first connecting side that is one side of the display panel and a second connecting side that is one side of the circuit board to bridge over one side of the backlight, the flexible wiring connecting the display panel and the circuit board to each other; and a support a support that supports the display panel or the circuit board by regulating at least one of a movement, on the first connecting side, toward at least a side opposite to the second connecting side and a movement, on the second connecting side, toward at least a side opposite to the first connecting side.

4 Claims, 3 Drawing Sheets

DISPLAY DEVICE

BACKGROUND OF THE INVENTION

1. Field of the Invention

The present invention relates to a display device and more particularly to supporting structures for connecting portions between flexible wiring and a display panel and between the flexible wiring and a circuit board.

2. Description of the Background Art

Generally, in display devices, a display panel (such as a liquid crystal panel) and a circuit board are connected by flexible wiring. On the rear surface of the liquid crystal panel, a backlight is disposed. In a state where the flexible wiring is bent, the circuit board is disposed on the rear surface of the backlight. The liquid crystal panel and the backlight are housed in a housing.

In the display device having the above structure, when vibrations or impact loads are applied from the outside, the liquid crystal panel and the circuit board inside the display device are deformed or shifted, whereby a tensile load and a bending load are generated in the flexible wiring. The repeated application of the excessive load caused by vibrations or impacts has resulted in the breakage of the flexible wiring.

In a case where the liquid crystal panel is fixed to the backlight by a double-sided adhesive tape to prevent the liquid crystal panel from being deformed, the costs have been increased and the repairability has deteriorated. In a case where a pressing structure made of cushion is provided for the liquid crystal panel or the circuit board, the costs have also been increased.

In fixing of the circuit board to the backlight, if the fixing member for the liquid crystal panel and the fixing member for the circuit board are separately fixed to the backlight, the difference in characteristic vibration between the members causes, in certain oscillation frequencies, the deforming stress on the liquid crystal panel and the circuit board in the opposite directions (the deforming stress on the liquid crystal panel toward the display-surface side and the deforming stress on the circuit board toward the side opposite to the display surface), whereby the tensile load on the flexible wiring has been increased.

In response to the above problem, in the display device disclosed in Japanese Patent Application Laid-Open No. 2006-235092, the liquid crystal panel and the circuit board are inserted into the fitting groove in the fame holder. Therefore, the liquid crystal panel and the circuit board are unaffected by the resilience generated in the bent portion of the flexible circuit board during adhesive fixing, whereby the adhering portion is prevented from peeling off.

As in the display device having the configuration in which the liquid crystal panel and the circuit board are inserted into the fitting groove in the frame holder according to Japanese Patent Application Laid-Open No. 2006-235092 mentioned above, the sides of the liquid crystal panel and the circuit board connected with the flexible wiring are not fixed by the frame holder, thus being deformed or shifted in the direction toward the display surface (or in the direction opposite toward the display surface) due to vibrations or impact loads from the outside. This has caused a tensile load and a bending load on the flexible wiring.

Moreover, when the liquid crystal panel and the circuit board are inserted into the fitting groove, the liquid crystal panel and the circuit board need to be alternately inserted into the frame holder so that the tensile stress is not applied onto the flexible wiring. This has deteriorated the workability of assembling.

SUMMARY OF THE INVENTION

The present invention has an object to provide a display device that suppresses a tensile load and a bending load on flexible wiring even when vibrations or impact loads are applied from the outside.

A display device according to the present invention includes a display panel, a backlight located on a rear surface of the display panel, and a circuit board located on a rear surface of the backlight. The display device also includes flexible wiring located between a first connecting side that is one side of the display panel and a second connecting side that is one side of the circuit board to bridge over one side of the backlight. The flexible wiring electrically connects the display panel and the circuit board to each other. The display device also includes a support that supports the display panel or the circuit board by regulating at least one of a movement, on the first connecting side, toward at least a side opposite to the second connecting side and a movement, on the second connecting side, toward at least a side opposite to the first connecting side.

The support is provided at at least one of the first and second connecting sides, to thereby prevent the simultaneous deformations of the display panel on the connecting side with the flexible wiring toward the display-surface side and of the circuit board on the connecting side with the flexible wiring toward the side opposite to the display surface. Thus, the tensile load and the bending load on the flexible wiring can be suppressed, whereby the flexible wiring can be prevented from breaking.

These and other objects, features, aspects and advantages of the present invention will become more apparent from the following detailed description of the present invention when taken in conjunction with the accompanying drawings.

DESCRIPTION OF THE PREFERRED EMBODIMENTS

<Prerequisite Technique>

Figure 6A:
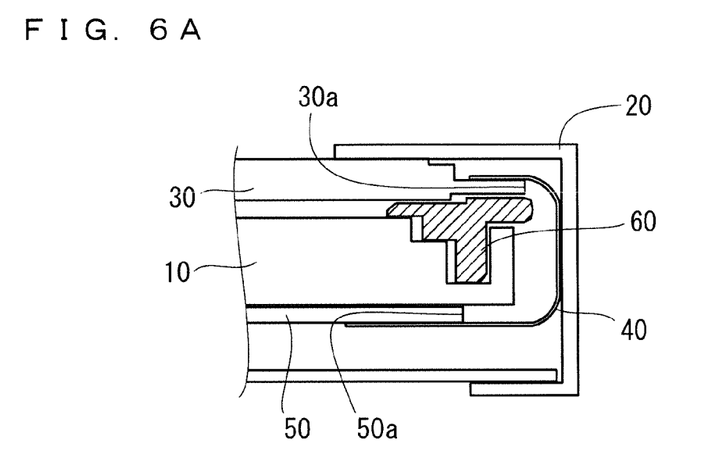
FIGS. 6A and 6B are cross-sectional views of a display device according to a prerequisite technique.
Figure 6B:
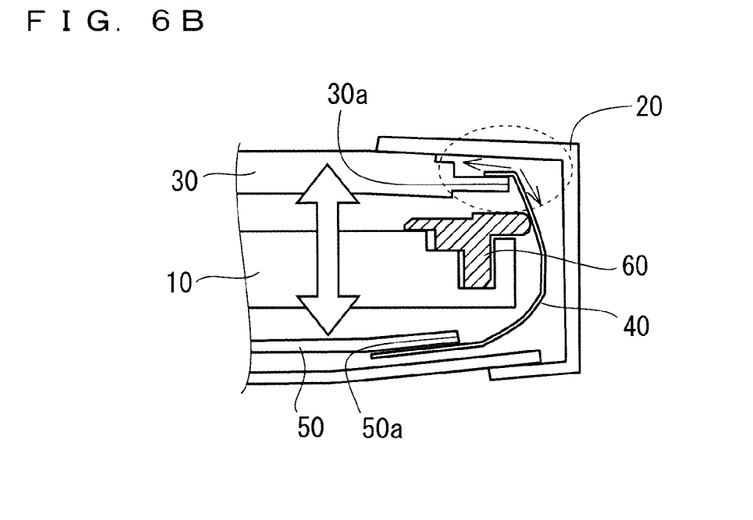

A technique on which the present invention is based is described before preferred embodiments of the present invention are described. FIG. 6A is a cross-sectional view of a display device according to a prerequisite technique. FIG. 6B is a view illustrating a load on flexible wiring in the display device according to the prerequisite technique.

As shown in FIG. 6A, the display device according to the prerequisite technique includes a display panel (such as a liquid crystal panel 30), a backlight 10 located on the rear surface of the liquid crystal panel 30 via a mold frame 60, a circuit board 50 located on the rear surface of the backlight 10. The display device also includes flexible wiring 40 located between a first connecting side 30*a* that is one side of the liquid crystal panel 30 and a second connecting side 50*a* that is one side of the circuit board 50 to bridge over one side of the backlight 10. The flexible wiring 40 electrically connects the liquid crystal panel 30 and the circuit board 50 to each other.

The liquid crystal panel 30, the backlight 10, the circuit board 50, the flexible wiring 40, and the mold frame 60 are accommodated in a housing 20.

In the display device having the above structure, when vibrations or impact loads are applied from the outside, the liquid crystal panel 30 and the circuit board inside the display device are deformed or shifted, whereby a tensile load and a bending load have been generated in the flexible wiring.

Assume that, as shown by a thick arrow in FIG. 6B, the liquid crystal panel 30 is deformed toward the display-surface side against the backlight 10 and the circuit board 50 is deformed toward the side opposite to the display surface against the backlight 10. In this case, for example, in the region encircled by dashed lines in FIG. 6B, a tensile load is applied onto the flexible wiring 40 in the direction of an arrow. The repetitive application of the tensile load could result in the breakage of the flexible wiring 40.

To prevent the liquid crystal panel 30 from being deformed, in a case where the mold frame 60 that fits into the backlight 10 and the liquid crystal panel 30 are fixed to each other by a double-sided adhesive tape and the backlight 10 and the circuit board 50 are fixed to each other by a double-sided adhesive tape, the costs have been increased and the repairability has deteriorated. The present invention suppresses a load applied onto the flexible wiring 40 with the simple structure without additionally including a double-sided adhesive tape or the like.

First Preferred Embodiment

<Overall Configuration>

Figure 1:
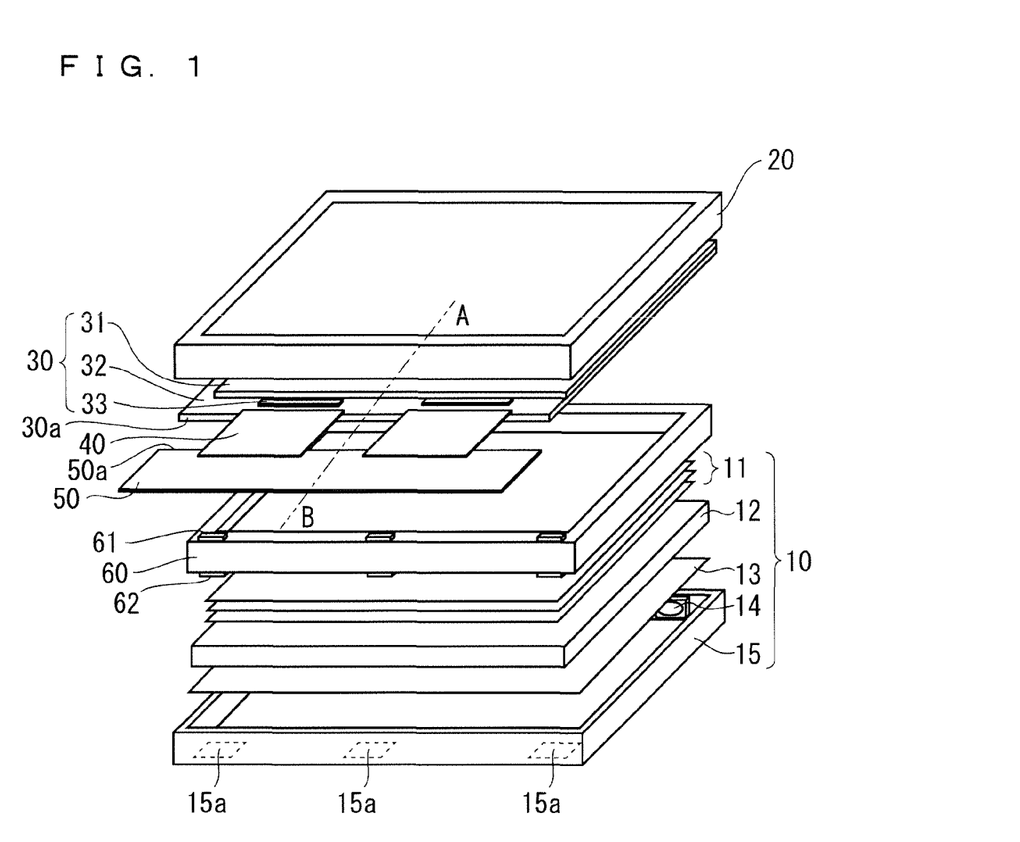
FIG. 1 is an exploded perspective view of a display device according to a first preferred embodiment.
Figure 2:
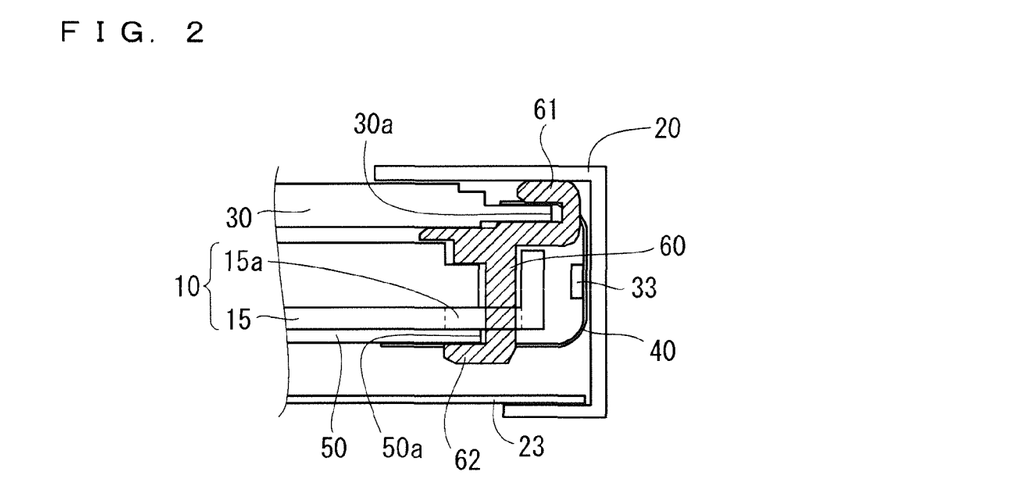
FIG. 2 is a cross-sectional view of the display device according to the first preferred embodiment.

FIG. 1 is an exploded perspective view of a display device according to this preferred embodiment. FIG. 2 is a cross-sectional view of the display device taken along the line AB in FIG. 1. In this preferred embodiment, the description is given assuming that the display device is, for example, a liquid crystal display device. As shown in FIGS. 1 and 2, the display device according to this preferred embodiment includes the liquid crystal panel 30 as a display panel, the backlight 10 that is located on the rear surface of the liquid crystal panel 30 and emits white light from the rear surface of the liquid crystal panel 30, and the circuit board 50 located on the rear surface of the backlight 10.

The display device according to this preferred embodiment further includes the flexible wiring 40 located between the first connecting side 30*a* that is one side of the liquid crystal panel 30 and the second connecting side 50*a* that is one side of the circuit board 50 to bridge over one side of the backlight 10. The flexible wiring 40 electrically connects the liquid crystal panel 30 and the circuit board 50 to each other. Note that the flexible wiring 40 in the extended state is illustrated in FIG. 1 for easy understanding of the structure of the display device. In the actual display device, as shown in FIG. 2, the circuit board 50 is turned down on the rear surface of the backlight 10 such that the flexible wiring 40 bridges over one side of the backlight 10.

The display device according to this preferred embodiment further includes a support 61 that supports the liquid crystal panel 30 by regulating a movement, on the first connecting side 30*a*, toward at least the side opposite to the second connecting side 50*a* (that is, toward the display-surface side).

The display device according to this preferred embodiment also includes a support 62 that supports the circuit board 50 by regulating a movement, on the second connecting side 50*a*, toward at least the side opposite to the first connecting side 30*a* (that is, toward the side opposite to the display surface).

In this preferred embodiment, the support 61 and the support 62 are integral with the mold frame 60. The support 61 and the support 62 are described later. Each of the above-mentioned members that constitute the display device according to this preferred embodiment is described below.

<Liquid Crystal Panel>

The liquid crystal panel 30 is a transmissive or transflective liquid crystal panel. The liquid crystal panel 30 includes a first substrate 31, a second substrate 32 opposed to the first substrate 31, and liquid crystals sandwiched by the first and second substrates 31 and 32. By applying the birefringence of liquid crystals, a colored layer, a light-shielding layer, and a counter electrode, and the like are formed on an insulating substrate made of, for example, glass in the first substrate 31. The second substrate 32 includes, for example, thin film transistors (hereinafter referred to as TFTs) serving as switching elements and pixel electrodes formed on an insulating substrate made of glass or the like. A drive IC 33 is mounted onto the second substrate 32. Note that the drive IC 33 may be mounted onto the flexible wiring 40 as shown in FIG. 2.

The liquid crystal panel 30 further includes, for example, a spacer that holds a gap between the first substrate 31 and the second substrate 32, a sealing material that bonds the first substrate 31 and the second substrate 32 to each other, a sealant for an inlet from which the liquid crystals are injected, an alignment film that aligns the liquid crystals, polarizing plates disposed on the lateral surfaces of the first and second substrates 31 and 32, a connection terminal that is disposed on the first connecting side 30*a* of the second substrate 32 and connected with the flexible wiring 40 although they not shown in FIG. 1.

<Flexible Wiring>

The flexible wiring 40 electrically connects the first connecting side 30*a* of the liquid crystal panel 30 and the second connecting side 50*a* of the circuit board 50 to each other. The flexible wiring 40 has, for example, a copper pattern formed thereon and is connected to the liquid crystal panel 30 and the circuit board 50 by soldering, the ACF, the connector connection, or the like. The flexible wiring 40 is made of a COF, a FPC, or other materials, which may be arbitrarily selected as long as being capable of transmitting electric signals, and can be transformed into desired shapes depending on the forms of the display devices.

<Circuit Board>

The circuit board 50 controls the liquid crystal panel 30, a light source 14 provided in the backlight 10, and the like, by electrical input and output. Commonly, to form the circuit board 50, the electric components are mounted, by soldering, onto the surface of the glass epoxy or the like having a copper pattern formed thereon. The circuit board 50 is disposed and fixed on the back surface of the display device (the rear surface of the backlight 10). The electric components (such as the drive IC 33) may be mounted onto the flexible printed circuit (FPC) of the flexible wiring 40, whereby a part of the circuit board 50 is formed.

To protect the circuit board 50 from external pressure or static electricity, a protective cover (not shown) may be attached to the circuit board 50. The protective cover is formed of a metal such as aluminum, stainless steel, or galvanized steel sheet or is formed of a thin film-shaped resin such as PET. In a case where the protective cover made of a metal is used, the insulation measures are desirably taken by bonding a sheet made of a resin such as PET to the protective cover on the circuit-board-50 side so that the circuit board 50 and the protective cover are insulated.

In the exploded perspective view of FIG. 1, the circuit board 50 is illustrated in a state of being unfolded to lie on the same plane as the liquid crystal panel 30. In a state where the display device is assembled, meanwhile, as shown in the cross section in FIG. 2, the flexible wiring 40 is folded to bridge over one side of the backlight 10, so that the circuit board 50 is disposed on the rear surface of the backlight 10.

<Backlight>

The backlight 10 applies light from the rear-surface side of the second substrate 32 of the liquid crystal panel 30. The backlight 10 includes the light source 14 that emits light, a light guide panel 12 that propagates the light emitted from the light source 14, optical sheets 11 that control the distribution and the spread of the light emitted from the light guide panel 12, and a reflective sheet 13 that reflects the light passing through the rear surface of the light guide panel 12 toward the display-surface side. The light source 14, the light guide panel 12, the optical sheets 11, and the reflective sheet 13 are housed in a frame 15. As shown in FIG. 1, in the frame 15, each of through-holes 15a is provided at a position corresponding to the support 62 of the mold frame 60.

Although an example of the light source 14 in which the point light source such as a LED or a laser diode is mounted onto the circuit board is shown in FIG. 1, a linear light source such as a cold cathode fluorescent lamp (CCFL) may be employed. The substrate onto which the point light source is mounted may be based on a common glass epoxy resin or may include a flexible flat cable. Alternatively, to enhance the heat dissipation properties, the substrate may be based on a metal such as aluminum or on a ceramic. In a case where the point light source such as a LED is employed, the elements emitting monochromatic light of, for example, red, green, or blue may be included. There exists, for example, a pseudo-white-light emitting element formed of an element emitting blue light and a fluorescent body emitting yellow light with the blue light. In this preferred embodiment, the description is given on an example in which the pseudo-white LED is included as the point light source.

The light guide panel 12 is made of, for example, a transparent acrylic resin, a polycarbonate resin, or glass. At least one of the counter-emitting surface and the emitting surface of the light guide panel 12 has the scattering dot pattern provided thereon or the prism shapes to emit light and adjust the light intensity distribution in the surface and the light emission direction. The optical sheets 11 disposed on the light guide panel 12 adjust the intensity distribution and the emission angel of the outgoing light. As the optical sheets 11, depending on the purposes, a required number of lens sheets for condensing light, diffusion sheets for uniforming light, viewing angle adjustment sheets for adjusting the brightness in the viewing angle direction are disposed.

On the frame 15, the light source 14 is disposed. As the material for the frame 15, a metal having high thermal conductivity is desirably used to conduct the heat emitted from the light source 14. Particularly, by including a housing made of aluminum or aluminum alloy having high thermal conductivity, the heat emitted from the light source 14 can be efficiently dissipated, whereby the temperature of the light source 14 can be lowered.

<Housing>

The housing 20 is formed of a frame-shaped member that houses and holds, for example, the liquid crystal panel 30, the backlight 10, the circuit board 50, and the flexible wiring 40 and of a housing rear-surface portion 23 that serves as the rear surface of the display device. The housing 20 is formed of, for example, a sheet metal or a resin molded product and is fastened to the backlight by a claw-shaped fixing structure or with screws. The housing 20 may be integrally formed or may be formed by combing a plurality of members. The fixing parts (such as screws or mounting holes) to fix the end product may be provided in the side surface or the front surface of the housing 20, in the housing rear-surface portion 23, or in the peripheral portions thereof.

Although the housing 20 and the housing rear-surface portion 23 are fixed to each other, generally by a hooking structure having claws or with screws, to thereby hold the backlight 10, the liquid crystal panel 30, the circuit board 50, and the like, the housing 20 and the housing rear-surface portion 23 may be formed into an integrated structure.

<Mold Frame>

The mold frame 60 has openings allowing the light from the backlight 10 to exit therethrough. The liquid crystal panel 30 is mounted, positioned, and held on the periphery of the mold frame 60 on the upper-surface side. The mold frame 60 may be made of a metal such as aluminum, stainless steel, or iron or be made of a resin material such as polycarbonate (PC) or acrylonitrile butadiene styrene (ABS).

As shown in FIG. 2, the mold frame 60 includes the support 61 on the first-connecting-side-30a side of the liquid crystal panel 30. The support 61 is integral with the mold frame 60. The end of the liquid crystal panel 30 on the first connecting side 30a is fitted between the support 61 and the body of the mold frame 60. Therefore, the support 61 regulates the first connecting side 30a of the liquid crystal panel 30 from moving toward at least the side opposite to the second connecting side 50a (that is, toward the display surface).

The support 61 is disposed at a position other than the position having the flexible wiring 40 connected thereto on the first connecting side 30a. As long as the support 61 does not overlap the flexible wiring 40, the support 61 may be disposed at any given position and any number of the supports 61 may be provided.

The support 61 may have any given shape as long as being capable of regulating the first connecting side 30a of the liquid crystal panel 30 from moving toward at least the side opposite to the second connecting side 50a (that is, toward the display surface). Thus, the support 61 may have any given size and any number of the supports 61 may be provided.

As shown in FIG. 2, the mold frame 60 includes the support 62 on the second-connecting-side-50a side of the circuit board 50. The support 62 is integral with the mold frame 60. The support 62 penetrates the through-holes 15a provided in the frame 15 of the backlight 10 and supports the circuit board 50 from the rear-surface side of the backlight 10. The end of the backlight 10 and the end of the circuit board 50 on the second connecting side 50a are fitted between the support 62 and the body of the mold frame 60. Therefore, the support 62 regulates the second connecting side 50a of the circuit board 50 from moving toward at least the side opposite to the first connecting side 30a (that is, toward the side opposite to the display surface).

The support 62 is disposed at a position other than the position having the flexible wiring 40 connected thereto on the second connecting side 50a. As long as the support 62 does not overlap the flexible wiring 40, the support 62 may be disposed at any given position and any number of the supports 62 may be provided.

The support 62 may have any given shape as long as being capable of regulating the second connecting side 50a of the circuit board 50 from moving toward at least the side opposite to the first connecting side 30a (that is, toward the side opposite to the display surface). Thus, the support 62 may have any given size and any number of the supports 62 may be provided.

Although the mold frame 60 in this preferred embodiment is formed to include both the support 61 provided on the first-connecting-side-30a side and the support 62 provided on the second-connecting-side-50a side, the mold frame 60 may include at least one of the support 61 and the support 62, whereby the load applied onto the flexible wiring 40 can be suppressed. The support 61 regulates at least a movement of the connecting side of the liquid crystal panel 30 connected with the flexible wiring 40 toward at least the display-surface side and the support 62 regulates at least a movement of the connecting side of the circuit board 50 connected with the flexible wiring 40 toward the side opposite to the display surface. Therefore, the deformations of the liquid crystal panel 30 and the circuit board 50 in the directions opposite to each other can be suppressed. Thus, if one of the support 61 and the support 62 is provided, the connecting portions on both sides of the flexible wiring 40 can be prevented from being pulled simultaneously in the opposite directions.

If the supports 61 and 62 provided on the mold frame 60 are disposed only on the connecting sides (namely, the first connecting side 30a and the second connecting side 50a) connected with the flexible wiring 40, the liquid crystal panel 30 and the circuit board 50 disposed in layers can be installed while sliding toward the supports 61 and 62 (from the left side to the right side in FIG. 2). This can improve the assembling operation and the repairability of the display device. The flexible wiring 40 is given a slack in advance, so that the assembling performance in the sliding assembling process described above and the repairability can be further improved.

The fitting portion between the support 61 and the liquid crystal panel 30 and the fitting portion between the support 62, and the backlight 10 and the circuit board 50 may have clearances so that the assembly can be facilitated. The flexible wiring 40 is given a slack in advance, so that the load applied onto the flexible wiring 40 can be suppressed even if changes or deformations are caused by vibrations or impacts that occur in the clearances. The supports 61 and 62 may be disposed between the two parts of the flexible wiring 40 shown in FIG. 1.

<Effects>

The display device according to the present invention includes: the display panel (namely, the liquid crystal panel 30); the backlight 10 located on the rear surface of the display panel; the circuit board 50 located on the rear surface of the backlight 10; the flexible wiring 40 located between the first connecting side 30a that is one side of the display panel and the second connecting side 50a that is one side of the circuit board 50 to bridge over one side of the backlight 10, the flexible wiring 40 electrically connecting the display panel and the circuit board 50 to each other; and the support 61 or 62 that supports the display panel or the circuit board 50 by regulating at least one of a movement, on the first connecting side 30a, toward at least the side opposite to the second connecting side 50a and a movement, on the second connecting side 50a toward at least the side opposite to the first connecting side 30a.

Therefore, in this preferred embodiment, the first connecting side 30a of the liquid crystal panel 30 connected with the flexible wiring 40 and the second connecting side 50a of the circuit board 50 connected with the flexible wiring 40 are supported by the supports 61 and 62 both disposed on the mold frame. If at least one of the supports 61 and 62 is provided, the liquid crystal panel 30 on the connecting side with the flexible wiring 40 or the circuit board 50 on the connecting side with the flexible wiring 40 is prevented from being deformed even when vibrations or impact loads are applied onto the display device from the outside. Moreover, if at least one of the support 61 and the support 62 is provided, the liquid crystal panel 30 and the circuit board 50 on the connecting sides with the flexible wiring 40 can be prevented from being pulled simultaneously in the opposite directions. Thus, the tensile load and the bending load on the flexible wiring 40 can be suppressed, whereby the flexible wiring 40 can be prevented from breaking.

The display device in this preferred embodiment further includes the mold frame 60 that houses the backlight 10. The support 61 is integral with the mold frame 60 on the first-connecting-side-30a side. The end of the display panel (namely, the liquid crystal panel 30) on the first connecting side 30a is fitted between the support 61 and the body of the mold frame 60.

Therefore, the support 61 is integrated into the mold frame 60 and the first connecting side 30a of the liquid crystal panel 30 is fitted between the support 61 and the body of the mold frame 60, to thereby regulate, without additionally including another member, the connecting side (namely, the first connecting side 30a) of the liquid crystal panel 30 connected with the flexible wiring 40 from moving toward the display-surface side. Thus, the tensile load and the bending load on the flexible wiring 40 can be suppressed, whereby the flexible wiring 40 can be prevented from breaking.

The display device according to this preferred embodiment further includes the mold frame 60 that houses the backlight 10. The support 62 is integral with the mold frame 60 on the second-connecting-side-50a side. The end of the backlight 10 on one side and the end of the circuit board 50 on the second connecting side 50a are fitted between the support 62 and the body of the mold frame 60.

Therefore, the support 62 is integrated into the mold frame 60 and the end of the backlight 10 and the second connecting side 50a of the circuit board 50 are fitted between the support 62 and the body of the mold frame 60, to thereby regulate, without additionally including another member, the connecting side (namely, the second connecting side 50a) of the circuit board 50 connected with the flexible wiring 40 from moving toward the side opposite to the display surface. Thus, the tensile load and the bending load on the flexible wiring 40 can be suppressed, whereby the flexible wiring 40 can be prevented from breaking.

Second Preferred Embodiment

<Configuration>

Figure 3:
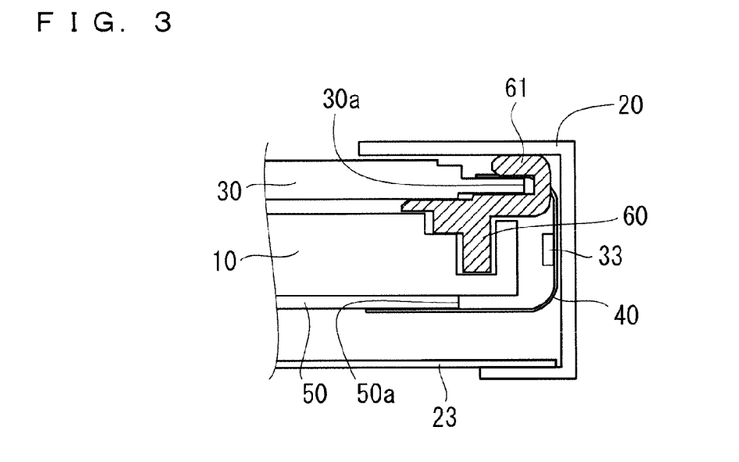
FIG. 3 is a cross-sectional view of a display device according to a second preferred embodiment.

FIG. 3 is a cross-sectional view of a display device according to this preferred embodiment. FIG. 3 is a cross-sectional view taken along the line AB in FIG. 1. However, in this preferred embodiment, the mold frame 60 does not include the support 62 in FIG. 1 and is formed to include only the support 61. Moreover, in this preferred embodiment, the frame 15 of the backlight 10 does not have the through-holes 15a.

As shown in FIG. 3, the mold frame 60 includes, similarly to the first preferred embodiment, the support 61 on the first-connecting-side-30a side of the liquid crystal panel 30. The support 61 is integral with the mold frame 60. The end of the liquid crystal panel 30 on the first connecting side 30a is fitted between the support 61 and the body of the mold frame 60. Thus, the support 61 regulates the first connecting side 30a of the liquid crystal panel 30 from moving toward at least the side opposite to the second connecting side 50a (that is, toward the display-surface side).

The support 61 is disposed at a position other than the position having the flexible wiring 40 connected thereto on the first connecting side 30a. As long as the support 61 does not overlap the flexible wiring 40, the support 61 may be disposed at any given position and any number of the supports 61 may be provided.

The support 61 may have any given shape as long as being capable of regulating the first connecting side 30a of the liquid crystal panel 30 from moving toward at least the side opposite to the second connecting side 50a (that is, toward the display surface). Thus, the support 61 may have any given size and any number of the supports 61 may be provided.

The configuration of the display device according to this preferred embodiment except for the above is the same as that of the first preferred embodiment, and the description thereof is omitted.

If the support 61 provided on the mold frame 60 is disposed only on the connecting side (namely, the first connecting side 30a) connected with the flexible wiring 40, the liquid crystal panel 30 can be installed while sliding toward the supports 61 (from the left side to the right side in FIG. 3). This can improve the assembling operation and the repairability of the display device. The flexible wiring 40 is given a slack in advance to allow the sliding of the liquid crystal panel 30 toward the support, so that the assembling performance and the repairability can be further improved.

The support 61 on the mold frame 60 may have a clearance such that the installation of the liquid crystal panel 30 can be facilitated. The flexible wiring 40 is given a slack in advance, so that the load applied onto the flexible wiring 40 can be suppressed even if changes or deformations are caused by vibrations or impacts that occur in the clearance. The support 61 may be disposed between the two parts of the flexible wiring 40 shown in FIG. 1.

<Effects>

The display device according to this preferred embodiment includes the support 61 that supports the liquid crystal panel 30 by regulating a movement, on the first connecting side 30a, toward at least the side opposite to the second connecting side 50a. The support 61 is integral with the mold frame 60 on the first-connecting-side-30a side. The end of the liquid crystal panel 30 on the first connecting side 30a is fitted between the support 61 and the body of the mold frame 60.

Therefore, in this preferred embodiment, the connecting side of the liquid crystal panel 30 connected with the flexible wiring 40 is supported by the support 61 that is integral with the mold frame 60. Therefore, when vibrations or impact loads from the outside are applied onto the display device, the liquid crystal panel 30 is prevented from being deformed toward at least the display-surface side. Thus, the tensile load and the bending load on the flexible wiring 40 can be suppressed, whereby the flexible wiring 40 can be prevented from breaking.

Third Preferred Embodiment

Figure 4:
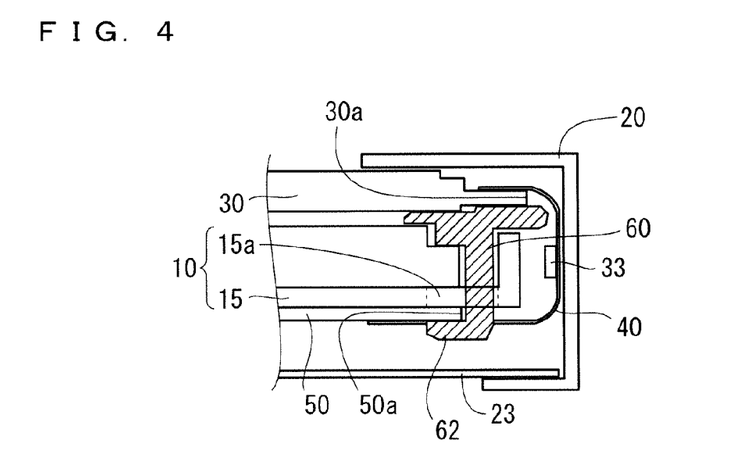
FIG. 4 is a cross-sectional view of a display device according to a third preferred embodiment.

FIG. 4 is a cross-sectional view of a display device according to this preferred embodiment. FIG. 4 is a cross-sectional view taken along the line AB in FIG. 1. However, in this preferred embodiment, the mold frame 60 does not include the support 61 in FIG. 1 and is formed to include only the support 62.

As shown in FIG. 4, the mold frame 60 includes, similarly to the first preferred embodiment, the support 62 on the second-connecting-side-50a side of the circuit board 50. The support 62 is integral with the mold frame 60. The end of the backlight 10 and the end of the circuit board 50 on the second connecting side 50a are fitted between the support 62 and the body of the mold frame 60. Thus, the support 62 regulates the second connecting side 50a of the circuit board 50 from moving toward at least the side opposite to the first connecting side 30a (that is, toward the side opposite to the display surface).

The support 62 is disposed at a position other than the position having the flexible wiring 40 connected thereto on the second connecting side 50a. As long as the support 62 does not overlap the flexible wiring 40, the support 62 may be disposed at any given position and any number of the supports 62 may be provided.

The support 62 may have any given shape as long as being capable of regulating the second connecting side 50a of the circuit board 50 from moving toward at least the side opposite to the first connecting side 30a (that is, toward the side opposite to display surface). Thus, the support 62 may have any given size and any number of the supports 62 may be provided.

The configuration of the display device according to this preferred embodiment except for the above is the same as that of the first preferred embodiment, and the description thereof is omitted.

If the support 62 provided on the mold frame 60 is disposed only on the connecting side (namely, the second connecting side 50a) connected with the flexible wiring 40, the circuit board 50 can be installed while sliding toward the support 62 (from the left side to the right side in FIG. 4). This can improve the assembling operation and the repairability of the display device. The flexible wiring 40 is given a slack in advance to allow the sliding of the circuit board 50 toward the support, so that the assembling performance and the repairability can be further improved.

The support 62 on the mold frame 60 may have a clearance such that the installation of the circuit board 50 can be facilitated. The flexible wiring 40 is given a slack in advance, so that the load applied onto the flexible wiring 40 can be suppressed even if changes or deformations are caused by vibrations or impacts that occur in the clearance. The support 62 may be disposed between the two parts of the flexible wiring 40 shown in FIG. 1.

<Effects>

The display device according to this preferred embodiment includes the support 62 that supports the circuit board 50 by regulating a movement, on the second connecting side 50a, toward at least the side opposite to the first connecting side 30a. The support 62 is integral with the mold frame 60 on the second-connecting-side-50a side. One side of the backlight 10 and the end of the circuit board 50 on the second connecting side 50a are fitted between the support 62 and the body of the mold frame 60.

Therefore, in this preferred embodiment, the connecting side of the circuit board 50 connected with the flexible wiring 40 is supported by the support 62 that is integral with the mold frame 60. When vibrations or impact loads from the outside are applied onto the display device, the circuit board 50 is prevented from being deformed toward at least the side opposite to the display surface. Thus, the tensile load and the bending load on the flexible wiring 40 can be suppressed, whereby the flexible wiring 40 can be prevented from breaking.

Fourth Preferred Embodiment

Figure 5:
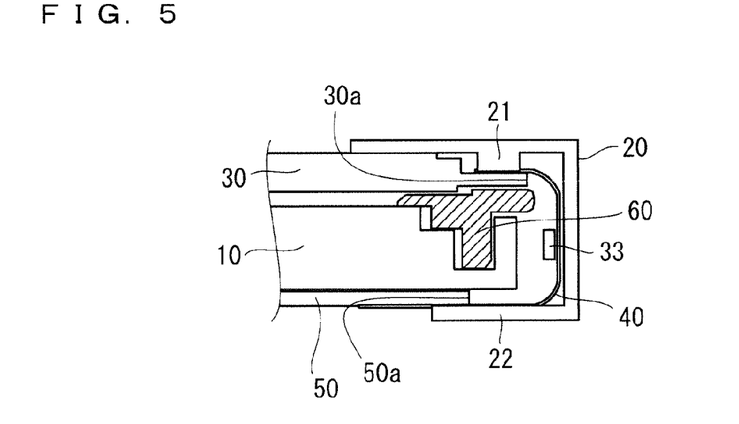
FIG. 5 is a cross-sectional view of a display device according to a fourth preferred embodiment.

FIG. 5 is a cross-sectional view of a display device according to this preferred embodiment. FIG. 5 is a cross-sectional view taken along the line AB in FIG. 1. However, in this preferred embodiment, the support 61 in FIG. 1 is not included, and instead, a support 21 that is described later is included in the housing 20. Moreover, in this preferred embodiment, the support 62 in FIG. 1 is not included, and instead, a support 22 that is described later is included in the housing 20. In this preferred embodiment, the frame 15 of the backlight 10 does not have the through-holes 15a.

As shown in FIG. 5, the housing 20 includes the projecting support 21 on the first-connecting-side-30a side of the liquid crystal panel 30. The support 21 is integral with the housing 20 and supports the end of the liquid crystal panel 30 on the first connecting side 30a from the display-surface side. Therefore, the support 21 regulates the first connecting side 30a of the liquid crystal panel 30 from moving toward at least the side opposite to the first connecting side 30a (that is, toward the side opposite to the display surface).

The support 21 is disposed at a position other than the position having the flexible wiring 40 connected thereto on the first connecting side 30a. As long as the support 21 does not overlap the flexible wiring 40, the support 21 may be disposed at any given position and any number of the supports 21 may be provided.

The support 21 may have any given shape as long as being capable of regulating the first connecting side 30a of the liquid crystal panel 30 from moving toward at least the side opposite to the second connecting side 50a (that is, toward the display surface). Thus, the support 21 may have any given size and any number of the supports 21 may be provided.

As shown in FIG. 5, the housing 20 includes the support 22 on the second-connecting-side-50a side of the circuit board 50. The support 22 is integral with the housing 20 and supports end of the circuit board 50 on the second connecting side 50a from the side opposite to the display surface. Therefore, the support 22 regulates the second connecting side 50a of the circuit board 50 from moving toward at least the side opposite to the first connecting side 30a (that is, toward the side opposite to the display surface).

The support 22 may have any given shape as long as being capable of regulating the second connecting side 50a of the circuit board 50 from moving toward at least the side opposite to the first connecting side 30a (that is, toward the side opposite to the display surface). Thus, the support 22 may have any given size and any number of the supports 22 may be provided.

The support 22 is disposed at a position other than the position having the flexible wiring 40 connected thereto on the second connecting side 50a. As long as the support 22 does not overlap the flexible wiring 40, the support 22 may be disposed at any given position and any number of the supports 22 may be provided.

In this preferred embodiment, the housing 20 has a configuration in which the support 21 disposed on the first connecting side 30a and the support 22 disposed on the second connecting side 50a are both included. However, if at least one of the support 21 and the support 22 is included in the configuration, the load on the flexible wiring 40 can be suppressed. The support 21 regulates at least a movement of the connecting side of the liquid crystal panel 30 connected with the flexible wiring 40 toward the display-surface side. The support 22 regulates at least a movement of the connecting side of the circuit board 50 connected with the flexible wiring 40 toward the side opposite to the display surface. That is, the deformations of the liquid crystal panel 30 and the circuit board 50 in the directions opposite to each other can be suppressed. Thus, if one of the support 21 and the support 21 is provided, the connecting portions on both sides of the flexible wiring 40 can be prevented from being pulled simultaneously in the opposite directions.

If the supports 21 and 22 provided in the housing 20 are disposed only on the connecting sides (namely, the first connecting side 30a and the second connecting side 50a) with the flexible wiring 40, the liquid crystal panel 30, the backlight 10, and the circuit board 50 disposed in layers can be installed while sliding between the supports 21 and 22 (from the left side to the right side in FIG. 5). This can improve the assembling operation and the repairability of the display device. The flexible wiring 40 is given a slack in advance, so that the assembling performance in the sliding assembling process described above and the repairability can be further improved.

Between the support 21 and the liquid crystal panel 30 and between the support 22 and the circuit board 50, clearances may be provided such that the assembly can be facilitated. The flexible wiring 40 is given a slack in advance, so that the load applied onto the flexible wiring 40 can be suppressed even if changes or deformations are caused by vibrations or impacts that occur in the clearances. The supports 21 and 22 may be disposed between the two parts of the flexible wiring 40 shown in FIG. 1.

<Effects>

The display device according to this preferred embodiment further includes the housing 20 that houses the display panel (namely, the liquid crystal panel 30), the backlight 10, the circuit board 50, and the flexible wiring 40. The support 21 is integral with the housing 20 on the first-connecting-side-30a side.

Therefore, the support 21 is integrated into the housing 20 and supports the first connecting side 30a of the liquid crystal panel 30, to thereby regulate, without additionally including another member, the connecting side (namely, the first connecting side 30a) of the liquid crystal panel 30 connected with the flexible wiring 40 from moving toward the display-surface side. Thus, the tensile load and the bending load on the flexible wiring 40 can be suppressed, whereby the flexible wiring 40 can be prevented from breaking.

The display device according to the present invention further includes the housing 20 that houses the display panel (namely, the liquid crystal panel 30), the backlight 10, the circuit board 50, and the flexible wiring 40. The support 22 is integral with the housing 20 on the second-connecting-side-50a side.

Therefore, the support 22 is integrated into the housing 20 and supports the second connecting side 50a of the circuit board 50, to thereby regulate, without additionally including another member, the connecting side (namely, the second connecting side 50a) of the circuit board 50 connected with the flexible wiring 40 from moving toward the side opposite to the display surface. Thus, the tensile load and the bending load on the flexible wiring 40 can be suppressed, whereby the flexible wiring 40 can be prevented from breaking.

Although the description has been given in the first to fourth preferred embodiments assuming that the display device is a liquid crystal display device and the display panel is a liquid crystal panel, the present invention is not limited to the liquid crystal display device and is applicable to the display devices in general in which images are displayed by irradiating the rear surface of the display panel with the light emitted from the backlight 10 to display images.

In the present invention, the above preferred embodiments can be arbitrarily combined, or each preferred embodiment can be appropriately varied or omitted within the scope of the invention.

While the invention has been shown and described in detail, the foregoing description is in all aspects illustrative and not restrictive. It is therefore understood that numerous modifications and variations can be devised without departing from the scope of the invention.

What is claimed is:

1. A display device comprising:
    a display panel;
    a backlight located on a rear surface of said display panel;
    a circuit board located on a rear surface of said backlight;
    flexible wiring located between a first connecting side that is one side of said display panel and a second connecting side that is one side of said circuit board to bridge over one side of said backlight, said flexible wiring electrically connecting said display panel and said circuit board to each other;
    a support that supports said display panel or said circuit board by regulating at least one of a movement, on said first connecting side, toward at least a side opposite to said second connecting side and a movement, on said second connecting side, toward at least a side opposite to said first connecting side; and
    a mold frame that houses said backlight, wherein
    said support includes a first support integral with said mold frame on said second-connecting-side side, and
    an end of said backlight on said one side and an end of said circuit board on said second connecting side are fitted between said first support and a body of said mold frame.

2. The display device according to claim 1, wherein
    said support includes a second support integral with said mold frame on said first-connecting-side side, and
    an end of said display panel on said first connecting side is fitted between said second support and a body of said mold frame.

3. A display device comprising:
    a display panel;
    a backlight located on a rear surface of said display panel;
    a circuit board located on a rear surface of said backlight;
    flexible wiring located between a first connecting side that is one side of said display panel and a second connecting side that is one side of said circuit board to bridge over one side of said backlight, said flexible wiring electrically connecting said display panel and said circuit board to each other;
    a support that supports said display panel or said circuit board by regulating at least one of a movement, on said first connecting side, toward at least a side opposite to said second connecting side and a movement, on said second connecting side, toward at least a side opposite to said first connecting side; and
    a housing that houses said display panel, said backlight, said circuit board, and said flexible wiring,
    wherein said support includes a first support integral with said housing on said second-connecting-side side.

4. The display device according to claim 3, wherein said support includes a second support integral with said housing on said first-connecting-side side.

* * * * *